Jan. 26, 1960   I. S. SAVERSLAK   2,922,718
METHOD OF PREPARING COOKED FOWL
Filed July 30, 1958   2 Sheets-Sheet 1
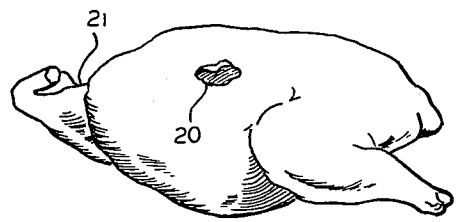
FIG. 1
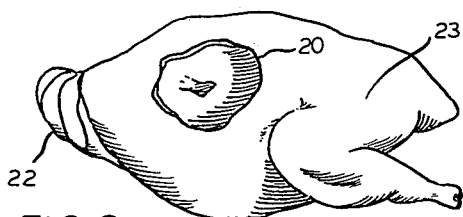
FIG. 2
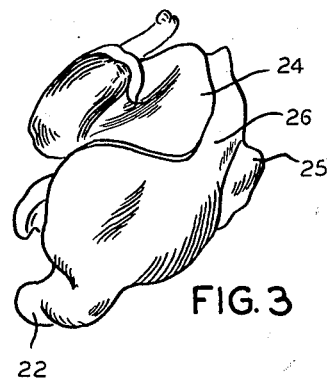
FIG. 3
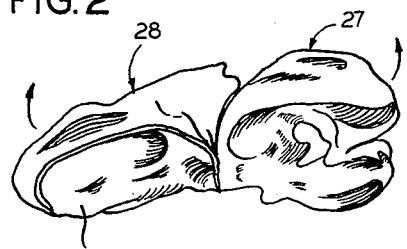
FIG. 4
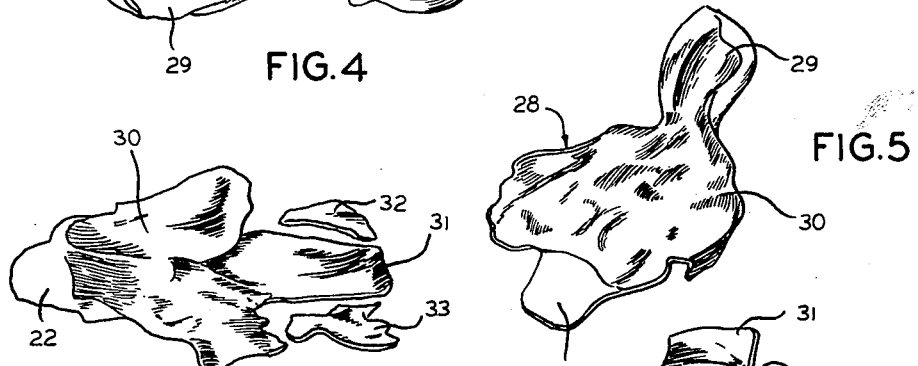
FIG. 5
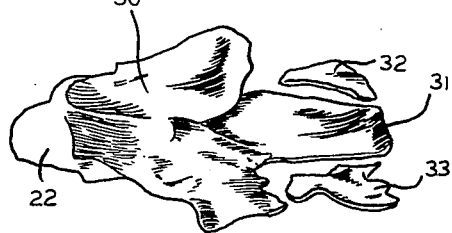
FIG. 6
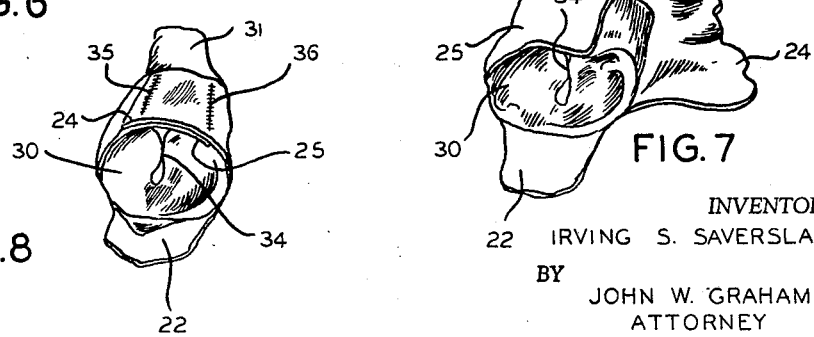
FIG. 7
FIG. 8
INVENTOR.
IRVING S. SAVERSLAK
BY JOHN W. GRAHAM
ATTORNEY

INVENTOR.
IRVING S. SAVERSLAK
BY
JOHN W. GRAHAM
ATTORNEY

United States Patent Office 2,922,718
Patented Jan. 26, 1960

2,922,718

METHOD OF PREPARING COOKED FOWL

Irving S. Saverslak, Highland Park, Ill.

Application July 30, 1958, Serial No. 751,935

2 Claims. (Cl. 99—107)

This invention relates to a cooked fowl product and method of preparing the same, and more particularly to a method of preparing a sliceable boneless poultry, such as turkey for example.

For some time there has existed a consumer demand for boneless fowl or poultry, and for this reason pressed duck, turkey, chicken, etc are now well known. Such products are prepared by compressing the meat pieces and fragments into a unitary mass, and thereafter cooking the same. One of the difficulties encountered is that the cooked product cannot be sliced for it crumbles and breaks apart.

I have discovered a method of preparing boned fowl that can be sliced after the cooking thereof, and the provision of such method is one of the objects of this invention. Another object of the invention is that of providing a boned poultry product in cooked form, that can be sliced in whole pieces and of any desired thickness.

Still another object of the invention is in the provision of a method of preparing turkey and the like, whereby the cooked food products comprising substantially all white meat that can be conveniently sliced without shredding or tearing or crumbling of the meat body. A further object is in the provision of a product and method of the character described, in which the skin of the bird is utilized as a casing that ensheathes the meat body during the cooking thereof, and compresses the meat body into an integral mass during such cooking cycle. Additional objects and advantages of the invention will become apparent as the specification develops.

An embodiment of the invention is illustrated in the accompanying drawings, in which—

Figure 12:
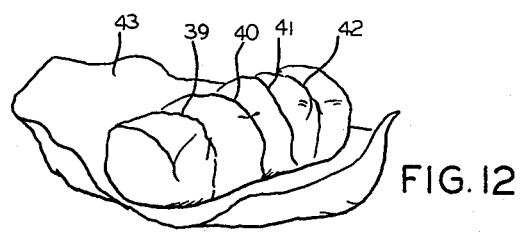
Figure 13:
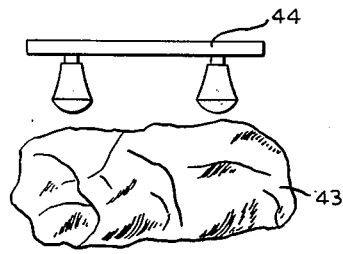
Figure 14:
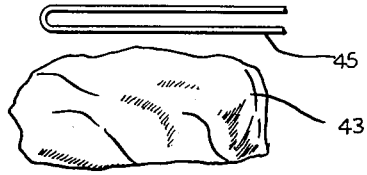
Figure 15:
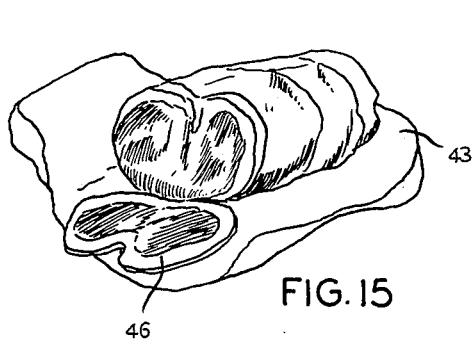
Figure 16:
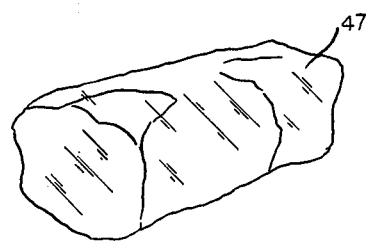

Figures 1 through 11, inclusive, are each perspective views illustrating the sequence of steps in the method; Figure 12 is a perspective view showing the step of wrapping the product in a container preparatory to the cooking cycle; Figure 13 is a side view in elevation showing the cooking cycle; Figure 14 is a side view in elevation illustrating the cooling cycle; Figure 15 is a perspective view showing the step of slicing the product; and Figure 16 is a perspective view illustrating the prepared product enclosed in a transparent wrapper.

The particular poultry product illustrated in the drawings is a turkey, that ordinarily will have a weight in excess of 20 pounds. The preliminary steps of cleaning the bird are not illustrated since they are completely conventional, and such plucked and eviscerated turkeys are available commercially. While certain of the steps are interchangeable one with another with regard to the precise sequence thereof, the first step as shown in Figure 1 may be that of removing the wings from the carcass. This can be accomplished by use of a boning knife, and it will be noted that the wings are carefully removed so as not to damage the surrounding layer of meat, as is indicated by the area denoted with the numeral 20. Next, the skin enclosing the neck is severed longitudinally along the upper surface 21 thereof and the neck is then removed, whereby the neck flap 22 remains.

Thereafter, the skin is cut along the leg area designated generally with the numeral 23 in Figure 2, and is stripped over each leg to provide the leg flaps 24 and 25 shown in Figure 3. The carcass is then cracked transversely across the back, generally at the location designated with the numeral 26 in Figure 3, whereupon the leg section 27 is joined with the breast section 28 only by the skin extending along the back. The arrows in Figure 4 show the directions of relative movement between the leg and breast sections 27 and 28 to effect the separation therebetween.

The leg section 27 is readily removed from the skin extending along the back, and may be discarded or sold separately. The bone cavity 29 is then loosened from the breast meat by means of a boning knife, and completely removed from the meat body as shown in Figure 5. The remaining mass of meat 30 comprises substantially all white meat for it is the breast of the turkey. After such operation, the product has the general configuration shown in Figure 6, and comprises the body of meat 30 having the neck flap 22 extending from one end thereof, and a rear flap 31 extending from the other end thereof which is integral with the leg flaps 24 and 25. In this state, the bird is completely boneless and is ready for the subsequent steps of encasing the meat body 30 completely within the remaining skin flaps. First, however, it is desirable to remove substantially all of the fatty tissue, such as may be present along the inner end portion of the neck flap 22 and portions of the back flap 31. Further, it has been found that portions of the leg flaps comprise thick skin membrane, and it is preferable to remove such portions as shown in Figure 6—such sections being identified with the numerals 32 and 33.

Figure 9:
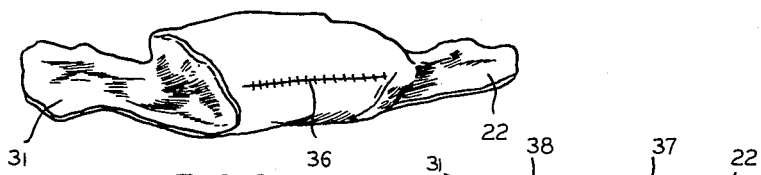
Figure 10:
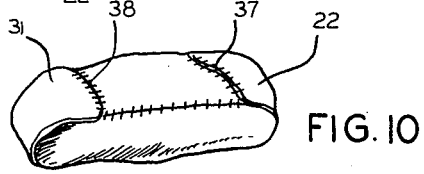

Next, the meat is rolled into a compact body of generally cylindrical configuration as shown in Figure 7, and the two portions meet generally along the line 34. The flaps 25 and 24 may then be drawn over the meat body, and such flaps overlap each other as shown in Figure 8. Preferably, the flaps are secured together along the lines 35 and 36 which extend longitudinally thereof. Thereafter, the neck flap 22 and tail flap 31 are drawn over the ends of the meat body 30, and are secured to the flaps 24 and 25 along the respective lines 37 and 38 as shown in Figure 10. At this time, the entire meat body is ensheathed in the skin casing which maintains the shape and form thereof. The various flaps are drawn snugly over the meat body, and they are secured in position by ordinary stitches. However, care must be exercised so as not to tear the skin during the sewing operations for the skin shrinks during the cooking cycle, and this factor is utilized to compress the meat body. It will be apparent that if the skin is ripped or torn along the stitch lines, it will tear to a greater extent as it shrinks whereby the compressive force exerted thereby on the meat body will be decreased.

It should also be emphasized that considerable care is taken as the bird is being deboned so as to leave the meat intact. That is to say, scrap particles, crumbs and so forth are discarded. Consequently, if the usable meat is to be maximized, careful cutting about the bones is required. The steps so far described may be performed at room temperature if desired, but ordinarily the bird will be taken directly from a freezer.

Figure 11:
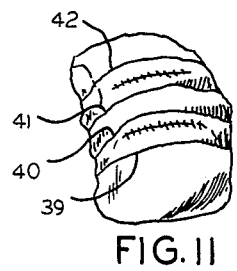

In some instances, it may be found desirable to shape the skin-ensheathed meat body prior to the cooking thereof, and in such event this may be accomplished by drawing cord thereabout as shown in Figure 11. Such cords are designated in Figures 11 and 12 with the numerals 39 through 42. In preparation for cooking the product, it may be enclosed in a wrapper 43 such as aluminum foil, and any spices or seasoning can be sprinkled directly onto the product before it is completely enclosed in the wrapper. Next, the wrapped product is placed in an oven and is cooked for approximately three hours at a temperature of about 375° F. Any conventional oven or other means may be employed to elevate the temperature of the product, and an exemplary device is indicated in Figure 13 with the numeral 44.

Following the cooking cycle, the product is cooled preferably for about twelve hours, and the cooling may be carried out either at room temperature or within a refrigerator at the normal temperature thereof which usually will be about 20° F. Refrigerated cooling is preferable, and in Figure 14 such a step is exemplified by the evaporator coils 45. Following the cooling of the product, the wrapper 43 is removed, the twine or cords 39 through 42 are released, and the natural juices developed during the cooking cycle and which will be found to have solidified within the foil wrapper 43 may be removed therefrom. In some cases, a very small amount of gelatin may be included in the package during the cooking thereof to help in solidifying the juices, although this is not essential. The product is now ready for use and can be sliced as shown in Figure 15, wherein one such slice is identified with the numeral 46. It is found that the product has been integrated, and as a result whole slices 46 are severed from the meat body without any noticeable crumbling. Further, the slices may be of any desired thickness and may be cut on a regular butcher's slicer.

As an alternative to selling the cooked product in sliced form, it can be sold in its bulk state, and in such event is preferably encased in a transparent wrapper that is sealed thereabout. Any of the conventional and well known wrappers may be employed as, for example, saran. Wrappers of this type can be made to conform to the product and are skin-like in their tightness. Such a wrapper is shown in Figure 16 and is designated with the numeral 47. Before the wrapper 47 is sealed, I prefer to enclose a portion of the congealed juices so that they will be available for flavoring, gravies, etc.

The end product may comprise about six to eight pounds of solid white meat (assuming a turkey having an initial weight of 20 to 24 pounds). The meat body during the cooking thereof has been compressed into a unitary or integral mass by the skin which incrementally shrinks more tightly thereabout as the heating cycle continues. Thus, the skin serves as a form or mold confining and constraining the meat body therewithin. There is no wastage in the entire cooked product since it is substantially solid white meat throughout, and since it may be cut into whole slices it is convenient to handle and serve.

While in the foregoing specification an embodiment of the invention both as to a product and method of preparing the same has been set forth in considerable detail for purposes of making an adequate disclosure thereof, it will be apparent to those skilled in the art that changes may be made therein without departing from the principles or spirit of the invention.

I claim:

1. In the process of preparing a cooked poultry product which will slice without shredding, the steps of separating from the carcass of an uncooked poultry product the breast meat in a substantially unitary mass and with the coextensive and adjacent skin portions attached thereto, forming the breast meat into a compact roll whereby certain of the free surface areas thereof are necessarily brought into contiguous relation, securing the attached skin portions in covering relation about said compacted breast meat with certain of said adjacent skin portions being in juxtaposed overlying relation, elevating the temperature of the thusly formed rolled product to cook the same whereby juices from the underlying skin portions flow into such contiguous surfaces of the meat mass while at the same time the shrinking skin thereabout compresses the meat mass into a unified integrated body.

2. The process of claim 1, in which such poultry product is turkey.

References Cited in the file of this patent

UNITED STATES PATENTS

| | | |
|---|---|---|
| 2,571,544 | Cutrera | Oct. 16, 1951 |
| 2,633,601 | Snyder | Apr. 7, 1953 |
| 2,640,779 | George | June 2, 1953 |
| 2,808,335 | Pierce | Oct. 1, 1957 |
| 2,844,844 | Sieczkiewicz | July 29, 1958 |